(12) United States Patent
Dutta et al.

(10) Patent No.: US 12,632,802 B2
(45) Date of Patent: May 19, 2026

(54) METHOD AND SYSTEM FOR RESOURCE MANAGEMENT

(71) Applicant: EATON INTELLIGENT POWER LIMITED, Dublin (IE)

(72) Inventors: Sourav Dutta, Dublin (IE); Andrei Marinescu, Dublin (IE); Leonard Feehan, Birr, Co. Offaly (IE); Manoj Gokhale, Pune (IN); Eugene Ryan, Dublin (IE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 612 days.

(21) Appl. No.: 18/001,412

(22) PCT Filed: Dec. 17, 2020

(86) PCT No.: PCT/EP2020/086689
§ 371 (c)(1),
(2) Date: Dec. 9, 2022

(87) PCT Pub. No.: WO2021/249665
PCT Pub. Date: Dec. 16, 2021

(65) Prior Publication Data
US 2023/0222400 A1 Jul. 13, 2023

(30) Foreign Application Priority Data

Jun. 10, 2020 (IN) .............................. 202011024409
Aug. 5, 2020 (GB) ...................................... 2012188

(51) Int. Cl.
G06Q 10/04 (2023.01)
G05B 19/042 (2006.01)
G06Q 50/06 (2012.01)

(52) U.S. Cl.
CPC ........... *G06Q 10/04* (2013.01); *G05B 19/042* (2013.01); *G06Q 50/06* (2013.01); *G05B 2219/2639* (2013.01)

(58) Field of Classification Search
CPC ....... G06Q 10/04; G06Q 50/06; G05B 19/042
(Continued)

(56) References Cited

U.S. PATENT DOCUMENTS 10,340,735 B2 * 7/2019 Yoo ................... H02J 13/00016
10,853,750 B2 * 12/2020 Daniel .................... G06F 16/27
(Continued)

FOREIGN PATENT DOCUMENTS

CN 103956919 A * 7/2014
CN 107769595 A * 3/2018 ............ H02M 7/219
(Continued)

OTHER PUBLICATIONS

Karla Kvaternik, et al., "Privacy-Preserving Platform for Transactive Energy Systems", arxiv.org, Cornell University Library, 201 Olin Library Cornell University Ithaca, NY 14853, Sep. 27, 2017 (Sep. 27, 2017), XP080824103, the whole document.
(Continued)

*Primary Examiner* — Crystal J Barnes-Bullock
(74) *Attorney, Agent, or Firm* — LEYDIG, VOIT & MAYER, LTD.

(57) ABSTRACT

A method of resource management for transferring resources from providers to consumers is described. The method comprises the following steps. Supply parameters for the providers and demand parameters for the consumers are established, and constraints on the allocation of the resources are also established, as is an optimisation function for determining matches between providers and consumers. The optimisation function is solved for the established constraints using a constraint-based problem solver to deter-
(Continued)

```
┌─────────────────────────────┐
│ ESTABLISH SUPPLY AND DEMAND │
│         PARAMETERS          │
└─────────────────────────────┘
         410
              ↓
┌─────────────────────────────┐
│    VALIDATION PROCESS AND    │
│ ESTABLISHMENT OF CONSTRAINTS │
└─────────────────────────────┘
         420
              ↓
┌─────────────────────────────┐
│  ESTABLISH POSITION WITHOUT  │
│         CONSTRAINTS          │
└─────────────────────────────┘
REPEAT FOR   430
EACH              ↓
TIMESLOT
┌─────────────────────────────────┐
│ IDENTIFY OPTIMISATION FUNCTION TO │
│ DETERMINE TRANSACTIONAL MATCHES   │
└─────────────────────────────────┘
         440
              ↓
┌─────────────────────────────┐
│ USE CONSTRAINT-BASED PROBLEM │
│ SOLVER ON OPTIMISATION FUNCTION │
└─────────────────────────────┘
         450
              ↓
┌─────────────────────────────┐
│  USE MATCHES IDENTIFIED FROM  │
│ PROBLEM SOLUTION FOR ENERGY   │
│         TRANSFER              │
└─────────────────────────────┘
         460
``` mine matches between providers and consumers. Resources are then transferred from providers to consumers according to the determined matches. A computing system adapted to perform this method is also described, along with a power distribution system including such a computing system.

25 Claims, 6 Drawing Sheets

(58) Field of Classification Search
USPC ........................................................ 700/295
See application file for complete search history.

(56) References Cited

U.S. PATENT DOCUMENTS

| | | | | |
|---|---|---|---|---|
| 11,689,613 | B2 * | 6/2023 | Dailianas | ............ G06F 9/45558 |
| | | | | 709/226 |
| 2018/0299852 | A1 | 10/2018 | Orsini | |

FOREIGN PATENT DOCUMENTS

| | | | | | |
|---|---|---|---|---|---|
| CN | 116632914 | A | * | 8/2023 | ................ H02J 3/38 |
| WO | WO-2012115966 | A2 | * | 8/2012 | ........ H02J 13/00016 |
| WO | 2019/070357 | A1 | | 4/2019 | |
| WO | 2019/084262 | A1 | | 5/2019 | |

OTHER PUBLICATIONS

CNIPA, Office Action issued Jul. 5, 2025 in corresponding Chinese Application No. CN 202080101930.X.

CNIPA, Office Action issued Sep. 9, 2025 in corresponding Chinese Application No. CN 202080101930.X.

* cited by examiner

METHOD AND SYSTEM FOR RESOURCE MANAGEMENT

TECHNICAL FIELD

The disclosure relates to a method and system for resource management. In particular embodiments, the disclosure relates to a system for effective matching of energy sources and loads, especially in relation to distributed energy resources, to allow energy to be provided through a transactive energy system.

BACKGROUND

Conventionally, most energy sources have been centralized, and power distribution has typically involved transmission of electrical power over long distances over a national or regional grid. Local power generation has generally been used by local users to meet some or all of their power needs directly, as an alternative or supplement to power from the grid.

Other models of power generation have developed, particularly since the increasing development of renewable power sources, which are typically smaller in scale and more variable in operation pattern than large coal, gas, or nuclear power plants. Renewable power sources will often function best as part of a distributed energy system (also called distributed generation or on-site generation, or decentralized energy). This involves electrical generation and storage performed by a variety of small, grid-connected or distribution system connected devices, known as distributed energy resources (DER). These distributed energy resources will typically have capacities of 10 MW or less. A distributed energy system will typically be a hybrid system, comprising multiple power sources of different types, along with energy storage capability, so the system is a distributed energy generation and storage system.

Distributed energy generation and storage systems are well adapted to supporting local environments—they will typically be managed as smart grids through an appropriate interface, and they may form microgrids disconnected or disconnectable from a main regional power grid. This approach allows autonomous operation and may promote grid resilience and lower the overall carbon footprint of power generation.

One challenge of using distributed energy resources in this way is that it can be challenging to match up producers and consumers, as there are likely to be a number of different producers and consumers in the same distributed energy system, and there may be significant variety in the nature of the power producers and providers and in the characteristics of the consumers. A balance can be obtained by strong control over the relevant grid—however, this will typically not lead to an efficient solution which meets the requirements of both generators and consumers effectively.

Existing study in this area has focused on load balancing, prediction of future demand and effective load aggregation. It would be desirable to find a way of managing the distribution of generated and stored power to consumers so that it satisfies the requirements of both buyers and sellers of energy as effectively as possible. This is only one of a number of domains in which it is challenging to allocate resources fairly and effectively, and it would be desirable to find a solution that was applicable to multiple such domains.

SUMMARY OF DISCLOSURE

In a first aspect, the disclosure provides a method of resource management for transferring resources from providers to consumers, the method comprising: establishing supply parameters for the providers and demand parameters for the consumers; establishing constraints on the allocation of the resources; establishing an optimisation function for determining matches between providers and consumers; solving the optimisation function for the established constraints using a constraint-based problem solver to determine matches between providers and consumers; and transferring resources from providers to consumers according to the determined matches.

This approach allows for a very efficient solution to be reached in transferring resources such as power from providers to consumers.

In embodiments, the method further comprising validating the supply parameters and the demand parameters after they are established. It may also comprise determining optimal values for the supply parameters and the demand parameters without constraints before solving the optimisation function for the established constraints. These steps may be used to establish that the problem is solvable, and that all parties can meaningfully participate in the process, before the constrained optimisation itself takes place.

In embodiments, solving the optimisation function is a linear programming problem. This allows linear solvers to be used, which can provide very fast and effective solutions.

In embodiments, the method is performed for a plurality of time slots, wherein at least the steps of establishing supply parameters and demand parameters, establishing an optimisation function, solving the optimisation function, and transferring resources are repeated for each time slot. The approaches discussed above support performance of the overall method sufficiently rapidly that time slots can be of the order of minutes (say fifteen minutes, for example). Different optimisation functions may be used for at least some of the time slots.

In embodiments, the resource is electrical power. The providers may then be power producers or power sources, and the consumers power consumers or loads. In some cases, a party may be either a power producer or a power consumer at different times—storage technologies may operate as "prosumers" in this way. In embodiments, supply parameters and demand parameters may comprise quantity of power—they may also comprise cost of power. In embodiments, the constraints may comprise systemic restraints for a power grid, and they may also comprise limitations placed by a provider or a consumer.

In embodiment, the method further comprises making a record of the transfer of resources from producers to consumers and storing the record in a secure storage. This secure storage may be a blockchain.

In a second aspect, the disclosure provides a computing system comprising a processor and a memory and programmed to perform as a platform for allocating resources from providers to consumers, the computing system comprising: means to receive and store supply parameters for the providers, demand parameters for the consumers, and constraints on the allocation of the resources; means to establish an optimisation function for determining matches between providers and consumers; and means to solve the optimisation function for the established constraints to determine matches between providers and consumers, the means comprising a constraint-based problem solver.

Such a computing system may be further adapted to determine constraints on the allocation of resources from received provider information and received consumer information. It may also comprise means for validating the supply parameters and the demand parameters after they are established. It may further comprise means to establish optimal values for the supply parameters and the demand parameters without constraints before solution of the optimisation function for the established constraints.

In embodiments, solving the optimisation function is a linear programming problem and the constraint-based problem solver is a linear programming problem solver.

Such a computing system may be adapted to allocate resources for a plurality of time slots, wherein at least establishing supply parameters and demand parameters, establishing an optimisation function, and solving the optimisation function will be repeated for each time slot. The means to establish an optimisation function may be adapted to establish different optimisation functions for different time slots.

In embodiments, the resource is electrical power, and the computing system is a power distribution platform. The providers may then be power producers or power sources, and the consumers power consumers or loads. Supply parameters and demand parameters may comprise quantity of power and cost of power, and they may comprise limitations provided by a producer or a consumer.

In a third aspect, the disclosure provides a power distribution system comprising a power distribution platform as described above in relation to the second aspect and means to distribute power over a power grid between providers and consumers according to matches determined by the power distribution platform. These constraints may comprise systemic restraints for a power grid.

BRIEF DESCRIPTION OF FIGURES

Embodiments of the disclosure will now be described, by way of example, with reference to the following figures, in which.

DETAILED DESCRIPTION

Embodiments of the disclosure can address problems of effective resource allocation in a number of different domains. Application to a transactive energy system will be described in detail below. Application to other domains will be described after this.

Figure 1:
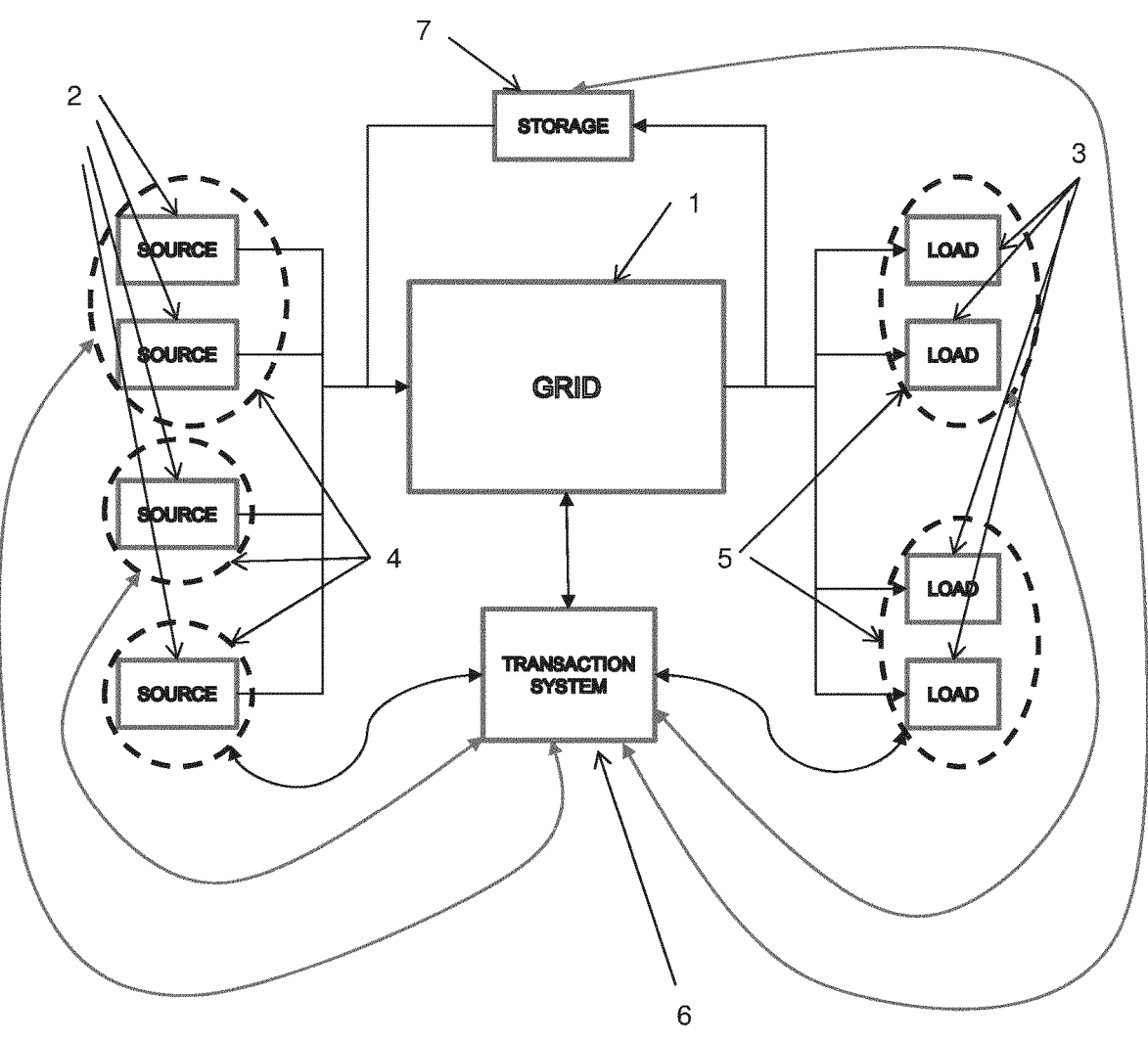
FIG. 1 illustrates schematically a transactive energy system in general terms.

FIG. 1 illustrates a transactive energy system in general terms. The system involves a power distribution system or grid 1 which receives power from a variety of power sources 2 and provides power to a variety of loads 3. The power sources 2 are associated with providers 4 and the loads 3 associated with consumers 5—the providers 4 and the consumers 5 are able to transact for power using a transaction system 6. The results of the transactions determined at the transaction system 6 determine the commitments of the providers 4, and so the contribution of the different sources 2 into the grid 1. The grid 1 will determine the actual demand and power provision to the different loads 3, and it will report back to the transaction system 6. The transaction system 6 will then determine what payment is required—typically, both the providers 4 and the consumers 5 will have accounts with the transaction system 6, and payments will be made through these accounts.

This arrangement allows for some complexity. For example, power storage 7 may operate as either a provider or a consumer—this may be termed a "prosumer". If power prices are high, the power storage may sell power and act as a provider, but if they are low, it may buy power and act as a consumer. Preferably, the transaction system 6 operates to change prices over time to reflect actual conditions of supply and demand in the power distribution system. Supply and demand will vary significantly during the course of a day, so it is desirable for the transaction system 6 to respond on a much shorter timescale than this—typically a timescale of minutes.

Figure 2:
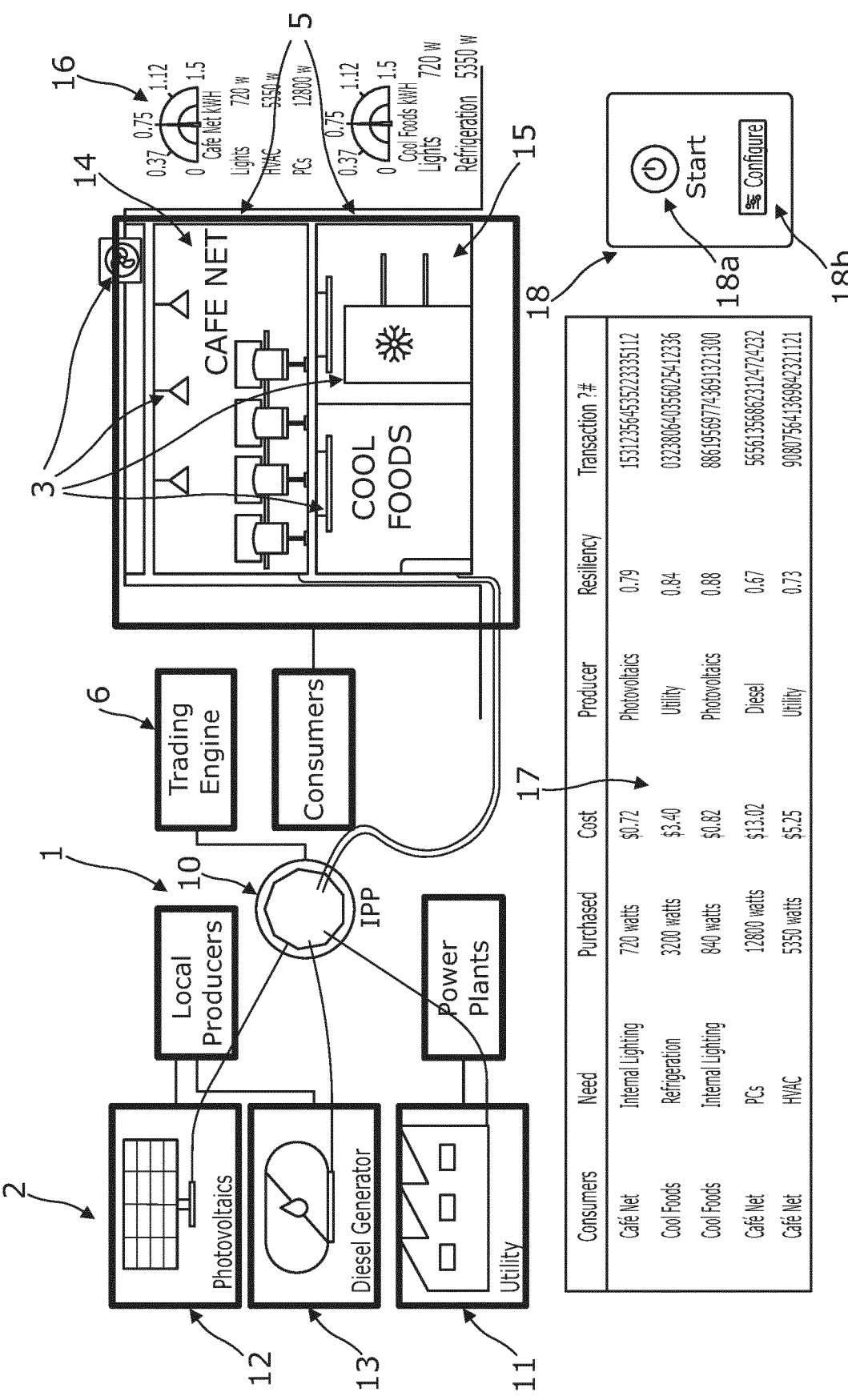
FIG. 2 shows elements of a micro-grid system that could be used as a transactive energy system.

FIG. 2 illustrates a microgrid example of a transactive energy system. Here, three different types of producers are shown through three different power sources 2—one is a conventional major power plant 11, whereas two are local producers: one renewable (photovoltaic array 12) and one conventional (diesel generator 13). Each of these producers has different qualities—in addition to being under different control and so prepared to offer power at different price points, they will also have different resilience (ability to reliably offer power at all times over a commitment) and obtain energy from different sources (brown or green power). The producers and their power sources 2 are connected to the loads 3 of the consumers through a microgrid 1, the key element of which is power platform 10, which interacts with transaction system (trading platform) 6. Here there are two consumers 5, Café Net 14 and Cool Foods 15, each of which have a number of loads 3. The consumers may have specific requirements (for example, Café Net may require green energy to be provided wherever possible) and loads may have specific requirements (for example, the refrigeration units at Cool Foods may prioritise resilience over any other requirement). As is shown in FIG. 2, the metering 16 for the building containing Café Net 14 and Cool Foods 15 indicates the actual consumption of both the consumers and the specific loads for each consumer.

A transactive energy system output 17 is shown in FIG. 2—this is shown for a specific period. This indicates each load of each consumer that has a demand during this period, and how the demand is met from a particular producer—the cost is identified, as is in this case the resiliency (this may be relevant, for example, if resilience expected of the producer was not in practice achieved). Each such element is identified by a different transaction ID. An interface is shown 18 with options to start 18a and configure 18b. Configuration allows producers and their sources, and consumers and their loads, to be added to or removed from the system. When the system is started, it will preferably simply continue to operate, with one time period succeeding another automatically, the criteria and transactions for one time period have been determined during the preceding time period or periods.

An approach to operating a transaction system or trading platform such as that illustrated above according to embodiments of the disclosure will now be described with reference to FIGS. 3 to 13. An appropriate computing system for use in implementing such a trading platform is shown in FIG. 3.

5

Figure 3:
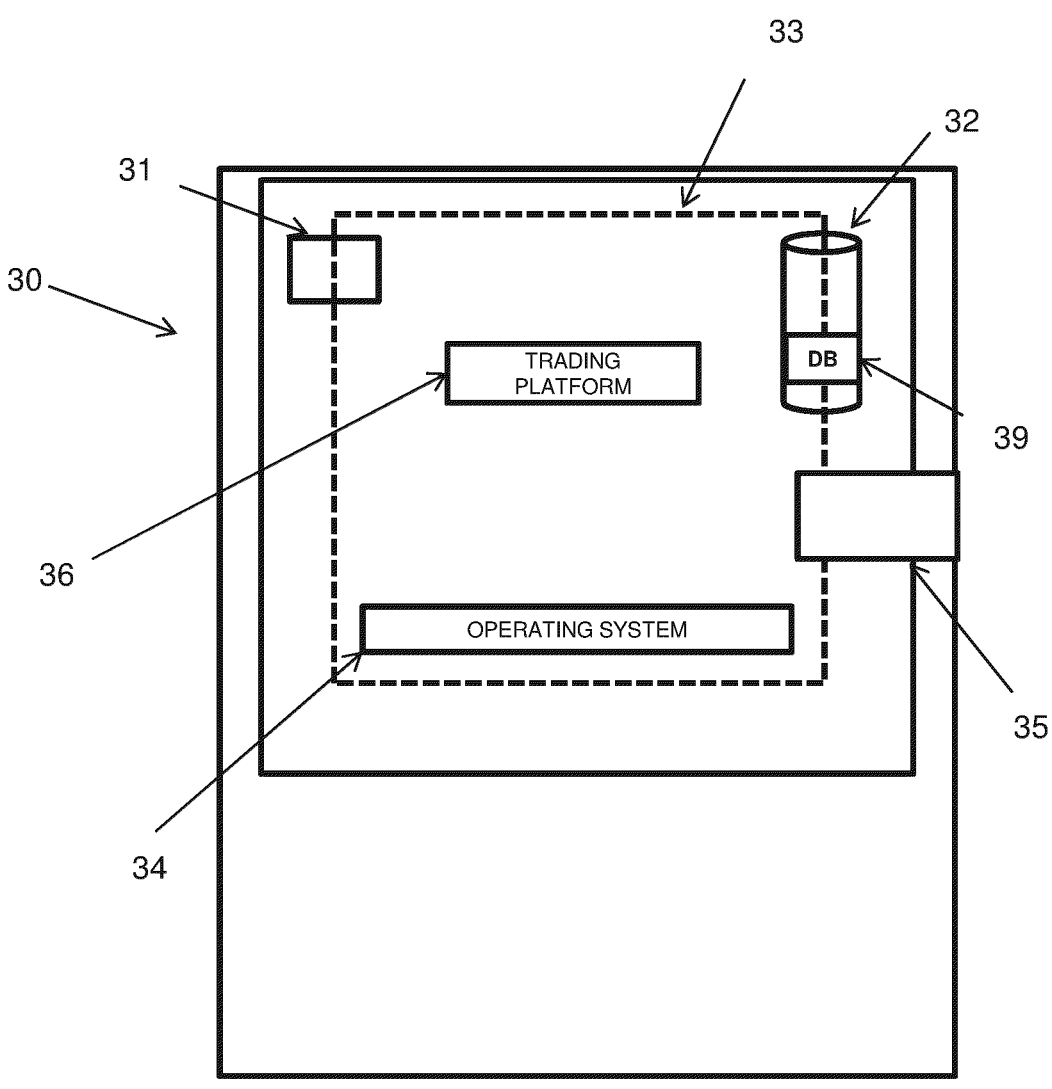
FIG. 3 shows a computing system suitable for use to implement a method of operating a transactive energy system according to embodiments of the disclosure.

FIG. 3 shows a computing system adapted for implementing a trading platform according to embodiments of the disclosure. The computing system 30 has a processor 31 and a memory 32 between them defining a computing environment 33 under the control of an operating system 34. The computing system has one or more networking connections 35 to allow it to communicate with buyers, sellers and the grid. The trading platform 36 is instantiated as an application running in the computing environment 33. The memory 32 contains a database 39 used by the trading platform 36.

Figure 4:
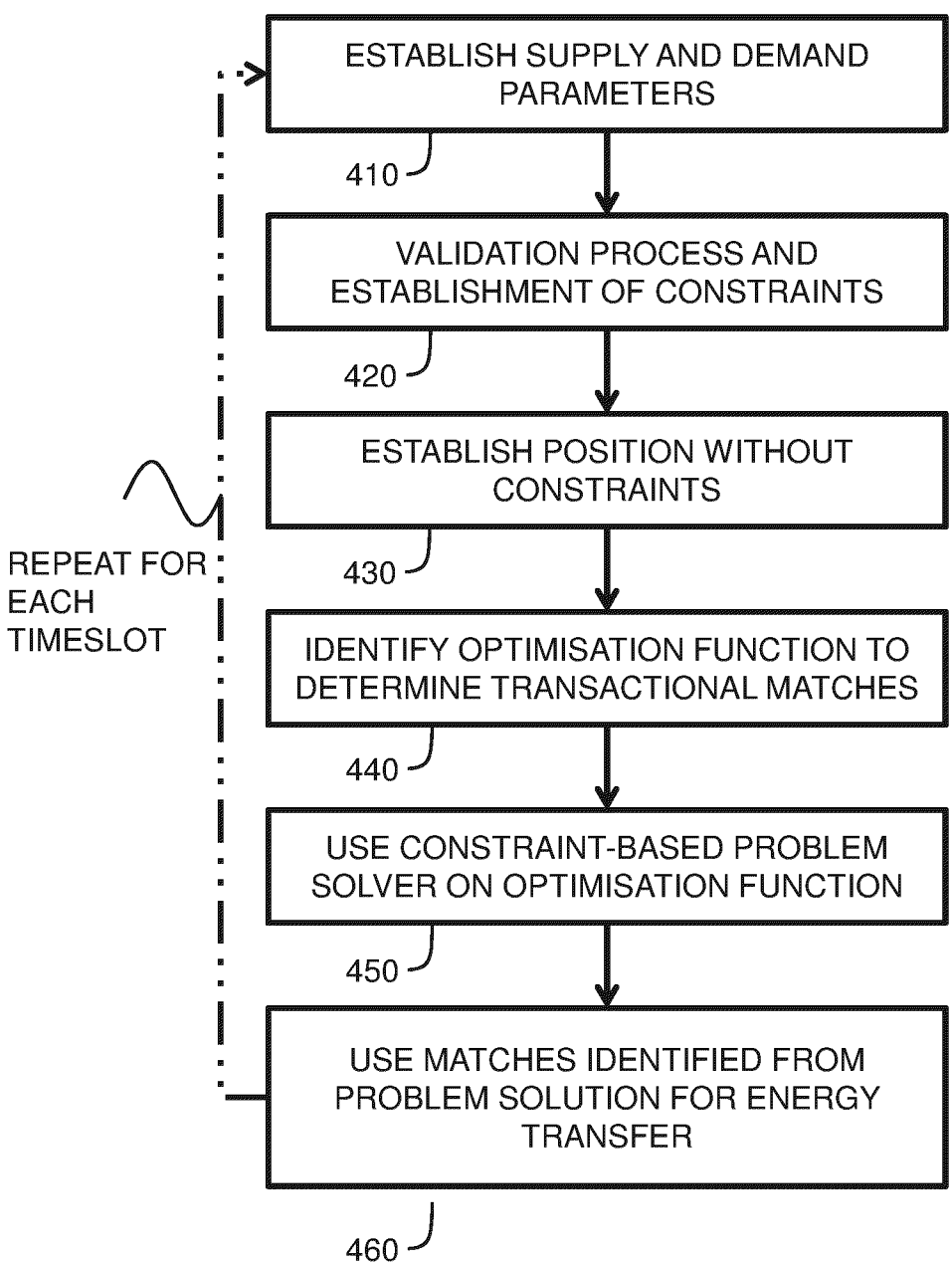
FIG. 4 shows a method of operating a transactive energy system in general terms according to embodiments of the disclosure.

FIG. 4 shows a method of operating a transactive energy system in general terms according to embodiments of the disclosure—the method achieves power distribution from a plurality of power sources to a plurality of loads by a matchmaking process. The process operates for a particular timeslot. First of all, the supply and demand parameters need to be established—the power sources available and their characteristics (including available supply) need to be established as do the loads and their requirements (including expected demand)—these are recorded 410, for example in an indexed data store.

This is followed by a validation and constraint establishment process 420. This establishes, for example, the feasibility of matching particular power sources and particular loads—for example, a buyer requiring only green energy may not accept power from a brown power source, and a load requiring very high reliability may not be able to accept power from a low reliability source. This may determine that certain source and load matches are impossible (or should attract some kind of penalty in any optimisation process)—the process as a whole establishes constraints on the problem, and may even eliminate some potential parties from the system altogether if it is established that their requirements can never be met.

The next step is to determine the position without constraints 430. This would involve determining an optimal value for all the transactional parameters without inclusion of any of the restraints (for example, assuming a source has unlimited supply, assuming that loads have no resilience restraints, and so on . . . ).

Once this has been done, an optimisation function can be employed 440 to optimise transactional matches between power source and load (or between supplier and consumer, if this is not resolved to the level of individual sources and loads). As discussed below, this optimisation function can take a variety of forms, but is designed to achieve one or more objectives of an effective matching process.

Existing mathematical constrained problem-solving tools can then be used 450 to generate an optimal matching between the parties (in a transactive energy eco-system) along with the amount of energy to be transacted between them. This matching is then used for energy transfer 460 during the time slot.

Figure 5:
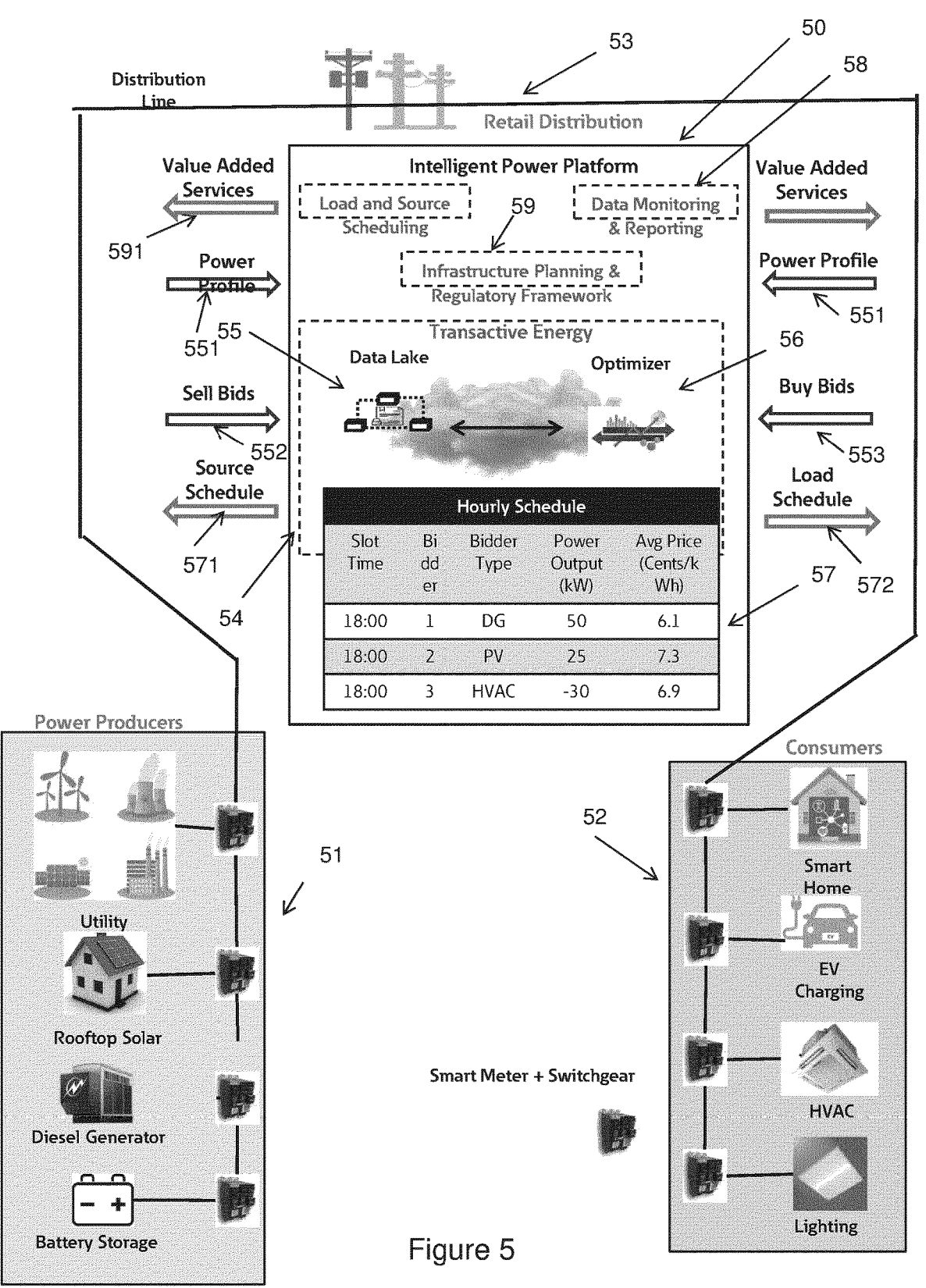
FIG. 5 shows a transactive energy system including an intelligent power platform adapted to implement an embodiment of the disclosure.
Figure 6:
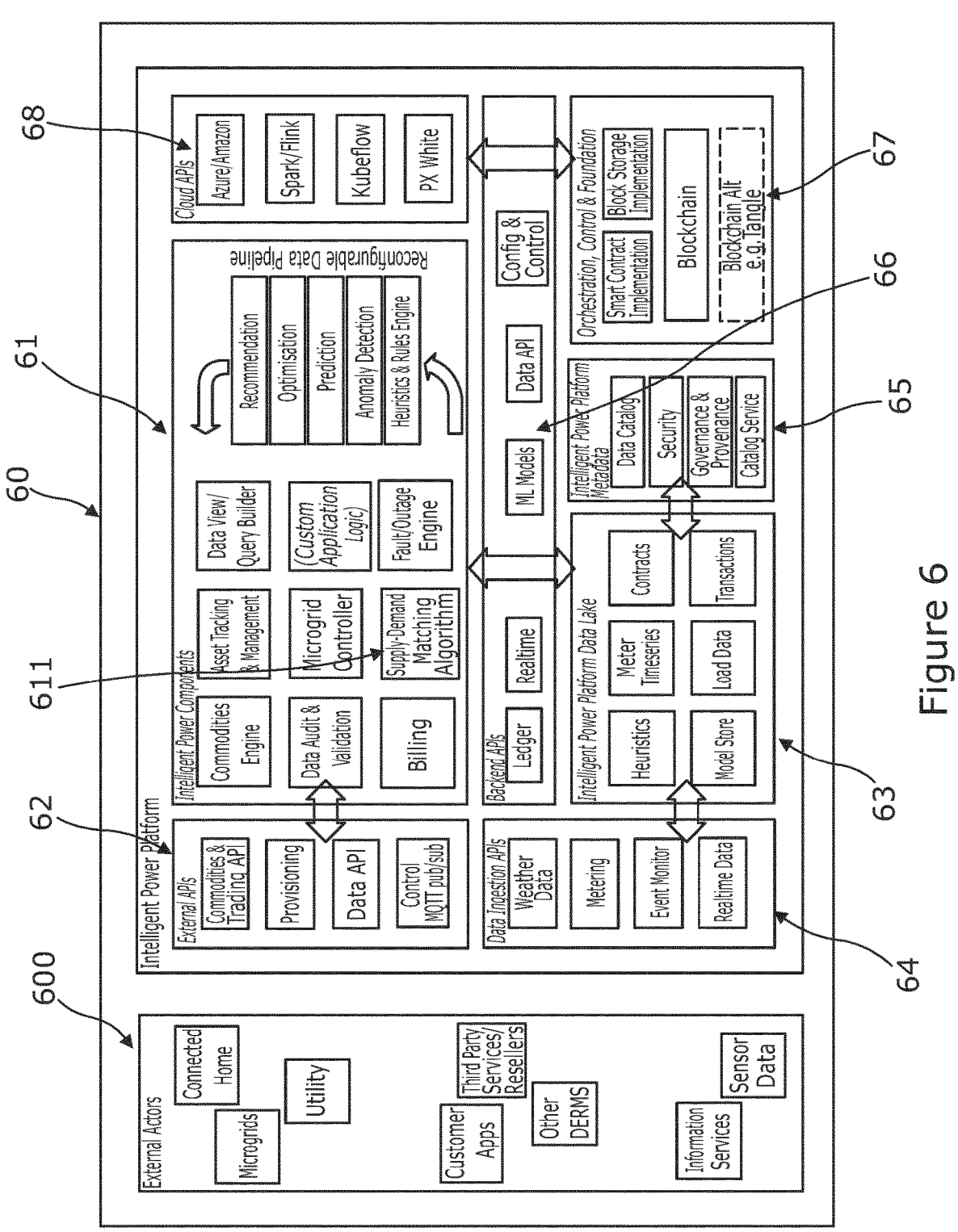
FIG. 6 illustrates a functional representation of an intelligent power platform as shown in FIG. 5.

FIGS. 5 and 6 show an environment in which a method as shown in FIG. 4 can be employed through use of a computing system adapted to perform as an energy trading and power control platform, here termed an intelligent power platform. FIG. 5 shows, comparably to FIG. 2, how an intelligent power platform 50 can act as an effective intermediary between a set of power producers 51 and a set of consumers 52 where power is provided over a retail distribution system 53. The heart of the intelligent power platform 50 is the transactive energy system 54, which receives and accesses data ("data lake" 55) and through an optimiser 56 develops a schedule 57. The data obtained includes power profiles 551 of both producers and consumers (which may be applicable to many timeslots) and producer "sell" bids 552 and consumer "buy" bids 553 which will typically be relevant to one timeslot. The optimiser developed schedule 57 is then transmitted to producers as a source schedule 571 and to consumers as a load schedule 572.

As shown in FIG. 5, the intelligent power platform 50 advantageously has functions beyond simply load and source scheduling—it will typically require data monitoring and reporting 58 to establish actual power usage and to provide accounting, and may have an infrastructure and regulation component 59 allowing it to operate in consistency with any regulatory requirements and consistently with local infrastructure requirements, but also allowing it to report back on infrastructural needs that are not being met. In this way value added services 591 may be provided to both producers and consumers.

FIG. 6 shows a functional representation 60 of an exemplary intelligent power platform, 50 as shown in FIG. 5, in more detail—this can be considered as a representation of the application space in a computing system as shown in FIG. 3, with other elements 600 external to the intelligent power platform capability also shown. These other elements 600 interact with the intelligent power platform 60, typically providing data to it, receiving data from it, or controlled on the basis of intelligent power platform output.

The core of the intelligent power platform 60 comprises of the intelligent power system components 61, with the present disclosure relating particularly to the supply-demand matching algorithm 611. The system components 61 provide the functionality of the intelligent power platform through a series of external APIs 62, but to do so they rely on the intelligent power platform data lake 63. This is fed by data ingestion APIs 64 and also interacts with a metadata facility 65 within the intelligent power platform 60 providing services to the data lake 63. Interaction between different elements of the intelligent power platform 60 is provided by backend APIs 66. Intelligent power platforms 60 may be adapted to support smart contracts and to provide evidence of contract performance through blockchain—this is here provided by an orchestration, control, and foundation facility 67. The intelligent power platform also interacts with cloud APIs 68 in implementing its functionality.

Embodiments of the present disclosure relate to matching of supply and demand—other aspects of an intelligent power platform 60 are illustrated here to show a context in which such matching is used, but further details of their implementation are not provided here as they are not necessary for understanding how the present disclosure is or may be implemented.

The supply-demand matching algorithm and its implementation will now be described in more detail. The algorithm requires input data—the key variable inputs will be the bids from producers/power sources and bids from consumers/loads. Preferably, the producers and their power sources and the consumers and their loads (assuming that the process is broken down to the level of individual loads or groups of loads) will already be known to the intelligent power platform and certain of their characteristics (such as a characterisation of a power source as green or brown, a required level of resiliency for a load, and possibly even an expected demand for a load) will already be stored so that it is accessible in the data lake. Other data—such as whether a power source or load will participate in a time slot at all, what price it is prepared to sell or buy energy at, and (in most cases) how much energy it is prepared to provide or expected to consume—will typically vary from time slot to timeslot. The length of a time slot needs to be sufficiently short that time slots accurately reflect variations in demand and supply, but sufficiently long that matching can be achieved on an appropriate timescale and accounting is practical and comprehensible. A time slot length of minutes (fifteen minutes, for example)—the optimisation process described below should typically resolve within a minute or so. Bids should be received sufficiently early that the matching process can be guaranteed to complete before the start of the time slot.

The next step is to compute the basic feasibility of matching a supplier, or their energy source, and a particular consumer, or their load. For example, if a particular consumer will only accept green energy, then they cannot be matched to a brown energy source. Likewise, if a particular load requires a particular level of resilience—for example, critical equipment in a hospital or another facility that cannot tolerate even a short power failure—then suppliers that cannot assure this level of resilience are not a possible match. In some cases, this may eliminate particular bids altogether (for example, a supplier demanding a price that no customer is prepared to pay), but in most cases it will simply constrain the possible matches.

The following step is to find the best solution for each transactional parameter—the best match possible—if there are no constraints. This allows, for example, each producer or source to have an unlimited supply when the "best match" for a load is assessed, and for constraints such as resilience to be disregarded. This establishes a "best theoretical" value for each transactional parameter. Subsequent optimisation determines how close to this "best theoretical" value it is possible to get in practice when all the transactional parameters are considered. This will also be a quick route to determining whether or not the optimisation is likely to succeed—if optimisation fails at this stage, there would appear to be no effective solution to the problem, and it may be desirable to adopt a backup strategy, such as requiring a new or altered bidding process to be performed, or another restricted optimisation strategy to be adopted.

The steps up to this point together provide a framework in which a determination of the best matches between producer (source) and consumer (load) can be made. A requirement function can now be determined which, when optimised, can provide these best matches. A variety of such functions can be identified, depending on what is considered to be the appropriate optimisation of the system—this could be based on transactional value (such as "minimise total transactional value" or "minimise transactional shortfall") or another criterion ("minimise wastage") or a combination of beneficial objectives. This can be a single objective function, or a multi-objective function with an appropriate weighting between different objectives.

At this point, an optimal solution is required for a function in a system having a number of constraints. This is amenable to solution by constrained programming (CP) techniques, such as by use of a mathematical constraint problem solver. If the function and constraints are linear, this becomes a linear programming problem, and a linear programming problem solver can be used. A suitable choice would be PuLP, described at https://coin-or.github.io/pulp/, which is open source software written in Python—the optimisation problem is prepared as a mathematical model in Python, and PuLP then calls on external linear programming problem solvers (such as CBC, GLPK, CPLEX and Gurobi) to solve the model—Python commands can then be used to manipulate and organise the solution. Other approaches using Gurobi and other generally available linear programming problem solvers can also be used. If constraints are more complex, linear solvers may not be sufficient—Gurobi however is not limited to linear programming problems and may still be used.

Using this approach, a packaged optimization solution can be provided for power allocation. While this is well adapted for a physical micro-grid, as is shown in FIG. 2, it is not limited in application to this context. Such an "optimization solution chipset" could be included within a virtual grid system that could even be used to enable a community to be assembled to transact using such a solution, even without a limitation to a specific physical context.

In this way, optimization of the possible set of transactions between buyers and sellers can be achieved while meeting the constraints offered by the system. These can be constraints on specific transactions, or systemic constraints—for example, the load limit on the electrical transformers in a geographical area may be a constraint, as when all sellers in an area want to sell to buyers outside that area, transformer load will be maximized and this may take them beyond operating limits.

The output of the system is an allocation of resources from producers—more specifically, from particular sources—to consumers, and even loads. The grid technology allocates power accordingly during a time slot, and it will typically also measure performance. The allocation provided by the optimization, and the measured performance, may be used to establish flow of money between producers, consumers and the grid, based on what was agreed and what the actual performance was. As noted above, the grid may use a smart contract approach—for example, agreements between producers and the grid, and between consumers and the grid, allocations for each timeslot, and performance for each timeslot all may be recorded in association with the smart contract on an immutable record such as a blockchain.

As noted, different optimization functions can be used, and this allows for the possibility of varying the optimization function between time slots. For example, the optimization function may be changed according to the time of day—for example, by maximizing solar(green) energy consumption during the day, and during the evening peak maximizing usage of energy storage to achieve peak shaving and to avoid demand response/load curtailment.

This approach to optimization also works well with prediction of future supply and demand—a prediction algorithm may be used to provide forecasts for demand (and also supply). With respect to demand, prediction is typically based on previously recorded daily patterns of consumers, based on calendar events (weekday/weekend public holidays), and weather conditions that have influence on consumption (on either heating or HVAC units) such as expected temperature and humidity. Supply considerations are particularly relevant to renewable energy sources. For renewable energy sources such as wind and solar, predictions rely on weather parameters forecasts, such as wind speed for the former and solar irradiation for the latter, coupled with localized information that might additionally affect the source (such as shading, PV panel orientation, and so on). Generally, prediction is based on a combination of historical knowledge, predictions about relevant factors (such as weather forecasts), and other information about the system. The optimization parameters may then be adjusted based on these forecasts.

As indicated above, embodiments of the disclosure may be used in other domains where analogous problems exist. Some of these domains are briefly discussed below—the person skilled in the art will be able to determine from the following discussion how the specific embodiment discussed above may be adapted to such domains, as the same technical framework can be used.

One domain where this approach can be used is in human resources and team management—specifically to the mapping of existing employees and new hires (or potential new hires) to teams based on matching skill sets to requirements. For effective development and operations of teams in organisations, better matching of candidate skills and interests to a team or project is extremely important. This is particularly significant during hiring, but also needs to support internal mobility of candidates to allow effective creation of teams with a desired range of expertise and diversity. Currently such processes are largely subjective and rely heavily on HR domain expertise. Embodiments of the present disclosure could however be used to identify and predict appropriate placement of resources by matching their expertise and interests to the project or team portfolio.

A further domain where this approach can be used is in cloud-based workload management. It is currently challenging to map requests for compute resources to available heterogenous hardware in environments where workloads are continually being created and destroyed. Providing cloud compute resources to customers requires matching request requirements with available hardware, while treating parties fairly in a multitenancy environment, while also adhering to service level agreements (SLAs) which will typically set minimum service levels for uptime or availability. These are typically met at present by providing very high levels of redundancy to ensure that all requirements are met, but this approach clearly uses resources very inefficiently. Embodiments of the disclosure can address these issues by using optimisation to promote better allocation and denser packing of compute workloads. In particular, they can ensure packing of multiple workloads on servers or other hardware, take into account multiple parameters for optimization and matching, and give consideration to requirements such as timing, migration and scaling. Basic workload requirements can be matched to hardware taking account of SLAs as a constraint, and workloads can be better packed by considering "time to live" and future available resources.

A further relevant domain is a more generalised case of the main example—the mapping of suppliers to their customers. Supply chain management is of vital importance in manufacture—efficiency in production relies heavily on a robust and well-oiled supply chain—but it is also highly complex. This can lead to very high costs arising if it is critically necessary to obtain particular supplies, particularly if there is variation from a regular pattern. Embodiments of the disclosure can be used to map suppliers to required products in a manner so as to reduce the operational cost of the organization—this can be done in such a way as to limit buying of products from suppliers that not only offer a cheaper rate, but also are reliable, ethical and have high product quality by providing appropriate validation. In embodiments, the optimisation process can provide automated recommendations as to which products should be bought from which supplier to enable efficiency, a principled and interpretable system to facilitate "good supply chain design", and prediction of the requirements of a product and assistance in placement of resource orders.

As the skilled person will appreciate, embodiments of the disclosure can be developed in many other contexts, such as urban planning (e.g. in the optimization of traffic junctions and placement of traffic signals to reduce congestion). Generally, the scope of the disclosure is not limited to the embodiments explicitly described above—it also extends to any other implementation falling within the spirit and scope of the claims set out below.

The invention claimed is:

1. A method of resource management for transferring electrical power from providers to consumers, wherein the providers are power sources and the consumers are loads, the method comprising:
establishing supply parameters for the providers and demand parameters for the consumers, wherein the supply parameters and the demand parameters comprise quantity of power;
establishing constraints on the allocation of electrical power;
establishing an optimisation function for determining matches between providers and consumers;
determining optimal values for the supply parameters and the demand parameters without the constraints:
after determining the optimal values, solving the optimisation function for the constraints using a constraint-based problem solver to determine matches between providers and consumers; and
transferring electrical power from the providers to the consumers according to the determined matches between the providers and the consumers.

2. The method of claim 1, further comprising validating the supply parameters and the demand parameters after they are established.

3. The method of claim 1, wherein solving the optimisation function is a linear programming problem.

4. The method of claim 1, wherein the method is performed for a plurality of time slots, wherein at least the steps of establishing the supply parameters and the demand parameters, establishing the optimisation function, solving the optimisation function and transferring resources are repeated for each time slot.

5. The method of claim 4, wherein different optimisation functions are used for at least some of the time slots.

6. The method of claim 1, wherein a party may be either a power producer or a power consumer at different times.

7. The method of claim 1, wherein the supply parameters and the demand parameters comprise a quantity of power.

8. The method of claim 7, wherein the supply parameters and the demand parameters comprise cost of power.

9. The method of claim 1, wherein the constraints comprise systemic restraints for a power grid.

10. The method of claim 1, wherein the constraints comprise limitations placed by a provider of the providers or a consumer of the consumers.

11. The method of claim 1, further comprising making a record of transferring of the electric power from producers to consumers and storing the record in a secure storage.

12. The method of claim 11, wherein the secure storage is a blockchain.

13. The method of claim 1, wherein the optimal values are determined by assuming that at least one power source of the power sources has unlimited supply and that the loads have no resilience restraint and wherein the optimisation function is solved to find matches as close as possible to the optimal values.

14. A computing system comprising a processor and a memory and programmed to perform as a platform for allocating electrical power from providers to consumers, wherein the providers are power sources and the consumers are loads, the computing system configured to:
receive and store supply parameters for the providers, demand parameters for the consumers, and constraints on allocation of the electric power, wherein the supply parameters and the demand parameters comprise quantity of power;

establish an optimisation function for determining matches between providers and consumers;

establish optimal values for the supply parameters and the demand parameters without the constraints;

after establishing the optimal values, solve the optimisation function for the constraints to determine matches between providers and consumers; and distribute electrical power over a power grid between producers and consumers according to the determined matches between the providers and the consumers.

15. The computing system of claim 14, further adapted to determine the constraints on the allocation of the electric power from received provider information and received consumer information.

16. The computing system of claim 14, wherein the computing system is further configured to validate the supply parameters and the demand parameters after they are established.

17. The computing system of claim 14, wherein solving the optimisation function is a linear programming problem and wherein the linear programming problem is solved by a linear programming problem solver.

18. The computing system of claim 14, wherein the computing system is adapted to allocate resources for a plurality of time slots, wherein at least establishing the supply parameters and the demand parameters, establishing the optimisation function and solving the optimisation function are repeated for each time slot.

19. The computing system of claim 18, wherein the computing system is further configured establish the optimisation function is adapted to establish different optimisation functions for different time slots.

20. The computing system of claim 14, wherein the computing system is a power distribution platform.

21. A power distribution system comprising a power distribution platform as claimed in claim 20.

22. The power distribution system of claim 21, wherein the constraints comprise systemic restraints for a power grid.

23. The computing system of claim 14, wherein the supply parameters and the demand parameters comprise a quantity of power and cost of power.

24. The computing system of claim 14, wherein the constraints comprise limitations provided by a provider or a consumer.

25. The computing system of claim 14, wherein the computing system includes a constraint-based problem solver to solve the optimisation function.

* * * * *